United States Patent
Jeon et al.

(10) Patent No.: US 8,526,499 B2
(45) Date of Patent: Sep. 3, 2013

(54) BI-PREDICTION CODING METHOD AND APPARATUS, BI-PREDICTION DECODING METHOD AND APPARATUS, AND RECORDING MEDIUM

(75) Inventors: Byeung Woo Jeon, Seongnam-si (KR); Bong Soo Jung, Seoul (KR); Kwang Hyun Won, Bucheon-si (KR)

(73) Assignee: Sungkyunkwan University Foundation for Corporate Collaboration, Suwon-Si (KR)

( * ) Notice: Subject to any disclaimer, the term of this patent is extended or adjusted under 35 U.S.C. 154(b) by 819 days.

(21) Appl. No.: 12/681,925

(22) PCT Filed: Feb. 19, 2008

(86) PCT No.: PCT/KR2008/000966
§ 371 (c)(1),
(2), (4) Date: Apr. 7, 2010

(87) PCT Pub. No.: WO2008/153262
PCT Pub. Date: Dec. 18, 2008

(65) Prior Publication Data
US 2010/0208817 A1    Aug. 19, 2010

(30) Foreign Application Priority Data

Jun. 15, 2007 (KR) .................. 10-2007-0059174
Feb. 19, 2008 (KR) .................. 10-2008-0014672

(51) Int. Cl.
*H04B 1/66* (2006.01)
(52) U.S. Cl.
USPC .................................. 375/240.15
(58) Field of Classification Search
USPC .................................. 375/240.15

IPC .......................................... H04B 1/66
See application file for complete search history.

(56) References Cited

U.S. PATENT DOCUMENTS

| 7,020,200 | B2 | 3/2006 | Winger |
| 8,144,776 | B2 * | 3/2012 | Yamori et al. ........... 375/240.16 |
| 8,259,805 | B2 * | 9/2012 | Herpel et al. ........... 375/240.15 |
| 2005/0129117 | A1 | 6/2005 | Jeon |
| 2005/0129119 | A1 | 6/2005 | Jeon |
| 2007/0019731 | A1 * | 1/2007 | Huang .................... 375/240.15 |
| 2009/0207914 | A1 * | 8/2009 | Choi et al. .............. 375/240.15 |

FOREIGN PATENT DOCUMENTS

KR    1020050042275    5/2005

* cited by examiner

*Primary Examiner* — Tung Vo
(74) *Attorney, Agent, or Firm* — Lexyoume IP Meister, PLLC.

(57) ABSTRACT

A bi-prediction decoding method includes determining whether or not a current block to be decoded is a bi-prediction coding mode by analyzing the coded data; recovering a decoding target motion vector by decoding the coded data in a case where it is determined that the current block is the bi-prediction coding mode; calculating the recovered decoding target motion vector, and a non-decoding target motion vector corresponding to a second reference picture based on a temporal distance between a current picture to which the current block belongs and a first decoding reference picture corresponding to the decoding target motion vector and a temporal distance between the current picture and a second decoding reference picture; and recovering the current block based on a generated prediction block by generating the prediction block for the current block based on the recovered decoding target motion vector and the calculated non-decoding target motion vector.

20 Claims, 10 Drawing Sheets

(A)

(B)

(A)

(B)

(A)

(B)

BI-PREDICTION CODING METHOD AND APPARATUS, BI-PREDICTION DECODING METHOD AND APPARATUS, AND RECORDING MEDIUM

TECHNICAL FIELD

The present invention relates to a method and an apparatus of bi-prediction coding, a method and an apparatus of bi-prediction decoding, and a recording medium; and more particularly, to a method and an apparatus of bi-prediction coding, a method and an apparatus of bi-prediction decoding, and a recording medium, which are capable of reducing degree of correlation in time-axis in compression of moving images.

BACKGROUND ART

According to MPEG-1, MPEG-2, and MPEG-4 fixed by the ISO/IEC JTC1, and an H.26x standard of the ITU-T, a P-picture coding method referring to a past picture so as to code a current picture and a B-picture coding method referring to both the past picture and a future picture are employed at the time of coding a current picture, and motion prediction coding is performed based on the methods.

In order to improve the coding efficiency of a motion vector, a motion vector of a current block is not just coded, but prediction coding of the motion vector is performed by using motion vectors of neighboring blocks so that a relation with the motion vectors of the neighboring blocks is reflected.

Therefore, in order to improve the coding efficiency, the accuracy of the motion vector and the minimization of a prediction error by using the same are important, but the compression efficiency of motion vector data should be also considered.

For the minimization of the motion prediction error, in a bidirectional prediction coding method, the accuracy of the motion vector is maximized by determining very accurate pair of motion vectors through a joint motion search so as to determine an optimal pair of a forward motion vector and a backward motion vector. However, in such bidirectional prediction coding method, very high complexity is required, and thus there are many difficulties in implementing the bidirectional prediction coding method.

In general, in order to overcome the difficulties, in implementing the bidirectional prediction coding method, in the bidirectional prediction coding method, after the search of the forward motion vector and the search of the backward motion vector are performed independently from each other, the bidirectional prediction coding is performed by using the searched optimal forward motion vector and backward motion vector.

However, in general, most of moving images are linearly moved. Even in this case, both the forward motion vector and the backward motion vector are transmitted without sufficiently using a fact that the motion of the images is linear. Accordingly, since more coding bits of the motion vector are generated, coding performance may deteriorate.

The conventional bidirectional prediction coding relating to the moving image compression will be hereinafter described in more detail. In the conventional bidirectional prediction coding, after predetermined prediction cost is calculated by using Equation 1 and Equation 2, a forward motion vector and a backward motion vector having minimum prediction cost are selected as a bidirectional prediction vector. An optimal bidirectional prediction reference block is determined by using the bidirectional prediction vector.

$$\hat{B}_{best}(mv_{fw}, mv_{bw}) = \min_{(mv_{fw}, mv_{bw}) \in (SR_{fw}, SR_{bw})} \text{COST}(B, \hat{B}(mv_{fw}, mv_{bw})) \quad \text{Equation 1}$$

$$\hat{B}(mv_{fw}, mv_{bw}) = w_{fw} B_{fw}(mv_{fw}) + w_{bw} B_{bw}(mv_{bw}) \quad \text{Equation 2}$$

Herein,
COST(•)
of Equation 1 represents a cost function and is generally determined by the sum of absolute differences (SAD) between the current block and a prediction block, a bit rate-distortion optimization method, or the like.
B
represents a current block to be coded and
$\hat{B}$
represents a prediction block acquired by the weighted sum of a forward reference picture block and a backward reference picture block as shown in Equation 2.
$mv_{fw}$
and
$mv_{bw}$
represent a forward motion vector value and a backward motion vector value, respectively.
$SR_{fw}$
and
$SR_{bw}$
represent a forward search range and a backward search range, respectively.
In Equation 1,
$\hat{B}_{best}$
represents a final prediction value for the bidirectional prediction coding. Herein, joint estimation is performed so as to find a final forward motion vector and a final backward motion vector for the bidirectional prediction coding. In case of the joint estimation, since motion estimations of
$SR_{fw}$
X
$SR_{bw}$
times are required and very large amount of computing and access to a reference picture memory are required, there are many practical problems in an actual moving image compression system.

Due to the above-described problems, in general, in the bidirectional prediction coding, as shown in Equation 3, after the forward motion vector and the backward motion vector are searched independently from each other, the bidirectional prediction is performed by using the forward motion vector and the backward motion vector found in Equation 3 as shown in Equation 4.

$$\hat{B}_{fw\_best}(mv_{fw}) = \min_{mv_{fw} \in SR_{fw}} \text{COST}(B, \hat{B}_{fw}(mv_{fw})) \quad \text{Equation 3}$$

$$\hat{B}_{bw\_best}(mv_{bw}) = \min_{mv_{bw} \in SR_{bw}} \text{COST}(B, \hat{B}_{bw}(mv_{bw}))$$

$$\hat{B}_{best}(mv_{fw}, mv_{bw}) = w_{fw} \hat{B}_{fw\_best}(mv_{fw}) + w_{bw} \hat{B}_{bw\_best}(mv_{bw}) \quad \text{Equation 4}$$

In Equation 3,
$\hat{B}_{fw}(mv_{fw})$
and
$\hat{B}_{bw}(mv_{bw})$
represent a block in a position of a motion vector of a forward reference picture and a block in a position of a motion vector of a backward reference picture, respectively.

$\hat{B}_{fw\ best}(mv_{fw})$
and
$\hat{B}_{bw\ best}(mv_{bw})$ represent a block in a position of a final motion vector found in the forward reference picture and a block in a position of a final motion vector found in the backward reference picture, respectively.

In Equation 4,
$\hat{B}_{best}(mv_{fw}, mv_{bw})$ represents an optimal bidirectional motion compensation block using the optimal forward motion vector and the optimal backward motion vector independently found in Equation 3.

However, in case of independently performing the bidirectional motion estimation, since the required number of searches is
$SR_{fw}$
+
$SR_{bw}$
, very low complexity is required, but bidirectional prediction performance deteriorates, and thus bit generation rate increases at the time of coding the motion vector.

Prior art developed to solve the problems is a symmetric mode in the bidirectional prediction employing the Chinese AVS (Advanced Video System) standard. In the symmetric mode, only the forward motion vector is transmitted and the backward motion vector is calculated by the use of a predetermined calculation formula in a decoder. After the forward motion vector and the backward motion vector required for the bidirectional prediction are acquired, a bidirectional prediction reference block is acquired.

In such symmetric mode, since the backward motion vector is used by being calculated to be symmetric to the forward motion vector, only the forward motion vector is transmitted. Accordingly, bit amount produced in the motion vector coding can be reduced.

In a case that calculating the backward motion vector by transmitting the forward motion vector is more advantageous than vice versa, the prior art can reduce the bit amount of the motion vector, which is required for the coding and can effectively implement a joint motion search of the forward motion vector and the backward motion vector. Therefore, the prior art can provide the bidirectional prediction method while scarcely increasing complexity of searching for a matching block of the motion search.

However, calculating the forward motion vector by transmitting the backward motion vector may be more advantageous than calculating the backward motion vector by transmitting the forward motion vector. Even in this case, since the prior art cannot help calculating the backward motion vector by transmitting the forward motion vector, it is willingly inefficient.

According to the bidirectional symmetric mode coding method of the prior art, one of the reference blocks used at the time of predicting the motion of the current block is brought from the forward reference picture and the other is brought from the backward reference picture. The reference blocks are applied only in a case that the forward reference picture is earlier than a current picture to which the current block belongs and the backward reference picture is later than the current picture. However, at the time of predicting the motion of the current block, a case that both the forward reference picture and the backward reference picture are earlier than or later than the current picture to which the current block belongs may be more advantageous than vice versa according to an image property. Even in this case, there is a problem that since only the early and later positioned reference pictures should be applied to the motion prediction according to the prior art, the compression efficiency is lowered.

DISCLOSURE OF INVENTION

Technical Problem

Accordingly, a first object of the present invention is to provide a bi-prediction coding method and apparatus which can solve a problem of complexity in implementing the bi-prediction coding of moving image compression, improve coding efficiency by more efficiently transmitting a motion vector based on a fact that an image is linearly moved, enhance deterioration of coding occurring due to only a forward motion vector is transmitted in a symmetric mode coding method which is any one conventional bidirectional prediction coding methods relating to the moving image compression, and perform efficient coding by easily performing joint estimation at the time of performing actual bi-prediction coding while reducing bit rate consumed for motion vector coding.

A second object of the present invention is to provide a bi-prediction decoding method and apparatus capable of performing more efficient decoding in decoding data coded in accordance with the above-described bi-prediction coding method and apparatus.

Technical Solution

The above-described first object of the present invention is achieved by a bi-prediction coding method using a plurality of reference pictures which includes the steps of: (a) selecting a first selected motion vector to a first reference picture for a current block to be coded; (b) calculating a first calculated motion vector to a second reference picture based on the first selected motion vector; (c) calculating first predicted coding cost based on the first selected motion vector, the first calculated motion vector, a first selected motion prediction block corresponding to the first selected motion vector, and a first calculated motion prediction block corresponding to the first calculated motion vector; (d) choosing a first representative selected motion vector and a first representative calculated motion vector that satisfy a predetermined criterion, and first representative predicted coding cost based on the first representative selected motion vector and the first representative calculated motion vector by repetitively performing the steps (a) to (c); (e) selecting a second selected motion vector from the second reference picture; (f) calculating a second calculated motion vector to the first reference picture based on the second selected motion vector; (g) calculating second predicted coding cost based on the second selected motion vector, the second calculated motion vector, a second selected motion prediction block corresponding to the second selected motion vector, and a second calculated motion prediction block corresponding to the second calculated motion vector; (h) choosing a second representative selected motion vector and a second representative calculated motion vector that satisfy a predetermined criterion, and second representative predicted coding cost based on the second representative selected motion vector and the second representative calculated motion vector by repetitively performing the steps (e) to (g); (i) choosing the first representative selected motion vector as a coding target motion vector and the first representative calculated motion vector as a non-coding target motion vector if the first representative predicted coding cost is smaller than the second representative predicted coding cost, and choosing the second representative selected motion vector as the coding target motion vector and the second representative calculated motion vector as the non-coding target motion vector if the second representative predicted coding cost is smaller than the first representative predicted coding cost; and (j) coding the coding target motion vector.

Herein, the step (j) may includes a step of coding bi-prediction coding mode information for reporting that the coding is a bi-prediction coding mode coded by the bi-prediction coding method.

In the step (b), the first calculated motion vector may be calculated by multiplying relative temporal distances between a current picture to which the current block belongs, and the first reference picture and the second reference picture by the first selected motion vector. In the step (f), the second calculated motion vector is calculated by the relative temporal distances between the current picture, and the first reference picture and the second reference picture by the second selected motion vector.

Herein, in a case where the first reference picture and the second reference picture are earlier and later than the current picture, respectively, the first calculated motion vector and the second calculated motion vector in the step (b) and the step (f) may be calculated by:

$$mv_{cal} = -\frac{TD_C}{TD_B} \times mv_{sel}$$

(wherein, $mv_{cal}$ is the first calculated motion vector or the second calculated motion vector, $mv_{sel}$ is the first selected motion vector or the second selected motion vector, $TD_B$ is a temporal distance between any one of the first reference picture and the second reference picture in which the first selected motion vector or the second selected motion vector is selected, and the current picture, and $TD_C$ is a temporal distance between the current picture and any one of the first reference picture and the second reference picture in which the first calculated motion vector or the second calculated motion vector is calculated).

In the case where both the first reference picture and the second reference picture are earlier or later than the current picture, the first calculated motion vector and the second calculated motion vector in the step (b) and the step (f) may be calculated by:

$$mv_{cal} = \frac{TD_C}{TD_B} \times mv_{sel}$$

(wherein, $mv_{cal}$ is the first calculated motion vector or the second calculated motion vector, $mv_{sel}$ is the first selected motion vector or the second selected motion vector, $TD_B$ is a temporal distance between any one of the first reference picture and the second reference picture in which the first selected motion vector or the second selected motion vector is selected, and the current picture, and $TD_C$ is a temporal distance between the current picture and any one of the first reference picture and the second reference picture in which the first calculated motion vector or the second calculated motion vector is calculated).

The above-described first object of the present invention may be achieved by a bi-prediction coding apparatus using a plurality of reference pictures, which includes a first motion vector selecting unit selecting first selected motion vectors corresponding to a plurality of first reference pictures within a predetermined motion search range based on a current block to be coded from the plurality of first reference pictures; a first motion vector calculating unit calculating first calculated motion vectors corresponding to the first selected motion vectors based on the first selected motion vectors and second reference pictures corresponding to the first selected motion vectors; a first coding cost calculating unit calculating first prediction coding costs corresponding to the first selected motion vectors based on the first selected motion vectors, the first calculated motion vectors, first selected motion prediction blocks corresponding to the first selected motion vectors, and first calculated motion prediction blocks corresponding to the first calculated motion vectors; a first coding cost choosing unit choosing first representative prediction coding cost that satisfies a predetermined condition by comparing the calculated plurality of first prediction coding costs corresponding to the first selected motion vectors with each other; a second motion vector selecting unit selecting second selected motion vectors corresponding to second reference pictures from the second reference pictures; a second motion vector calculating unit calculating the second selected motion vectors and second calculated motion vectors corresponding to the second selected motion vectors based on the first reference pictures corresponding to the second selected motion vectors; a second coding cost calculating unit calculating second prediction coding costs corresponding to the second selected motion vectors based on the second selected motion vectors, the second calculated motion vectors, second selected motion prediction blocks corresponding to the second selected motion vectors, and second calculated motion prediction blocks corresponding to the second calculated motion vectors; a second coding cost choosing unit choosing second representative prediction coding cost that satisfies a predetermined condition by comparing the calculated plurality of second prediction coding costs corresponding to the second selected motion vectors with each other; a motion vector choosing unit choosing any one of the first selected motion vectors corresponding to the first representative prediction coding cost as a coding target motion vector if the first representative prediction coding cost is smaller than the second representative prediction cost and any one of the second selected motion vectors corresponding to the second representative prediction coding cost as the coding target motion vector if the second representative prediction coding cost is smaller than the first representative prediction coding cost; and a motion vector coding unit coding the coding target motion vector.

The above-described second object of the present invention is achieved by a bi-prediction decoding method for decoding bi-prediction coded data by using a plurality of reference pictures, which includes the steps of: (a) determining whether or not a current block to be decoded is a bi-prediction coding mode by analyzing the coded data; (b) recovering a decoding target motion vector by decoding the coded data in a case where it is determined that the current block is the bi-prediction coding mode; (c) calculating a non-decoding target motion vector corresponding to a second reference picture based on the recovered decoding target motion vector, a temporal distance between a current picture to which the current block belongs and a first decoding reference picture corresponding to the decoding target motion vector, and a temporal distance between the current picture, and a second decoding reference picture; and (d) reconstructing the current block based on a generated prediction block by generating the prediction block for the current block based on the recovered decoding target motion vector and the calculated non-decoding target motion vector.

Herein, in the step (c), the non-decoding target motion vector may be calculated by multiplying relative temporal distances between the current picture, and the first reference picture and the second reference picture by the decoding target motion vector.

In a case where the first reference picture and the second reference picture are earlier and later than the current picture, respectively, the non-decoding target motion vector in the step (c) may be calculated by:

$$mv_{cal} = -\frac{TD_C}{TD_B} \times mv_{sel}$$

(wherein, $mv_{cal}$ is the non-decoding target motion vector, $mv_{sel}$ is the decoding target motion vector, $TD_B$ is a temporal distance between the first reference picture and the current picture, and $TD_C$ is a temporal distance between the second reference picture and the current picture).

Herein, in the case where both the first reference picture and the second reference picture are earlier or later than the current picture, the non-decoding target motion vector in the step (c) may be calculated by:

$$mv_{cal} = \frac{TD_C}{TD_B} \times mv_{sel}$$

(wherein, $mv_{cal}$ is the non-decoding target motion vector, $mv_{sel}$ is the decoding target motion vector, $TD_B$ is a temporal distance between the first reference picture and the current picture, and $TD_C$ is a temporal distance between the second reference picture and the current picture).

The above-described second object of the present invention may be achieved by a bi-prediction decoding apparatus for decoding bi-prediction coded data by using a plurality of reference pictures, which includes an entropy decoding unit decoding the coded data; a decoding controlling unit determining whether or not a current block to be decoded is coded through a bi-prediction coding mode by analyzing the decoded data; a decoding target motion vector recovering unit recovering a decoding target motion vector from the decoded data if the current block is coded in the bi-prediction coding mode by the decoding controlling unit; a non-decoding target motion vector calculating unit calculating a non-decoding target motion vector corresponding to a second reference picture based on the recovered decoding target motion vector, a temporal distance between a current picture to which the current block belongs to and a first reference picture corresponding to the decoding target motion vector, and a temporal distance between the current picture and the second reference picture; a motion compensating unit generating at least one prediction block based on the recovered decoding target motion vector and the calculated non-decoding target motion vector; and a current block reconstructing unit reconstructing the current block based on the recovered data and the prediction block.

Advantageous Effects

In accordance with the present invention, in selecting a coding target motion vector and a non-coding target motion vector for a current block, since a calculated motion vector having higher coding efficiency is selected and coded by calculating a first calculated motion vector to a second reference picture based on a first selected motion vector selected from a first reference picture and calculating a second calculated motion vector for the first reference picture based on a second selected motion vector selected from a second reference picture, coding efficiency of a transmitted motion vector can be further increased and coding efficiency of a prediction error can be improved.

It is possible to enhance the deterioration of coding performance occurring due to transmitting only a forward motion vector in a symmetric mode coding method which is one of conventional bidirectional prediction coding methods relating to moving image compression and to perform more efficient coding by easily performing joint estimation at the time of actual bi-prediction coding while reducing bit rate consumed for coding the motion vector.

BEST MODE FOR CARRYING OUT THE INVENTION

Figure 1:
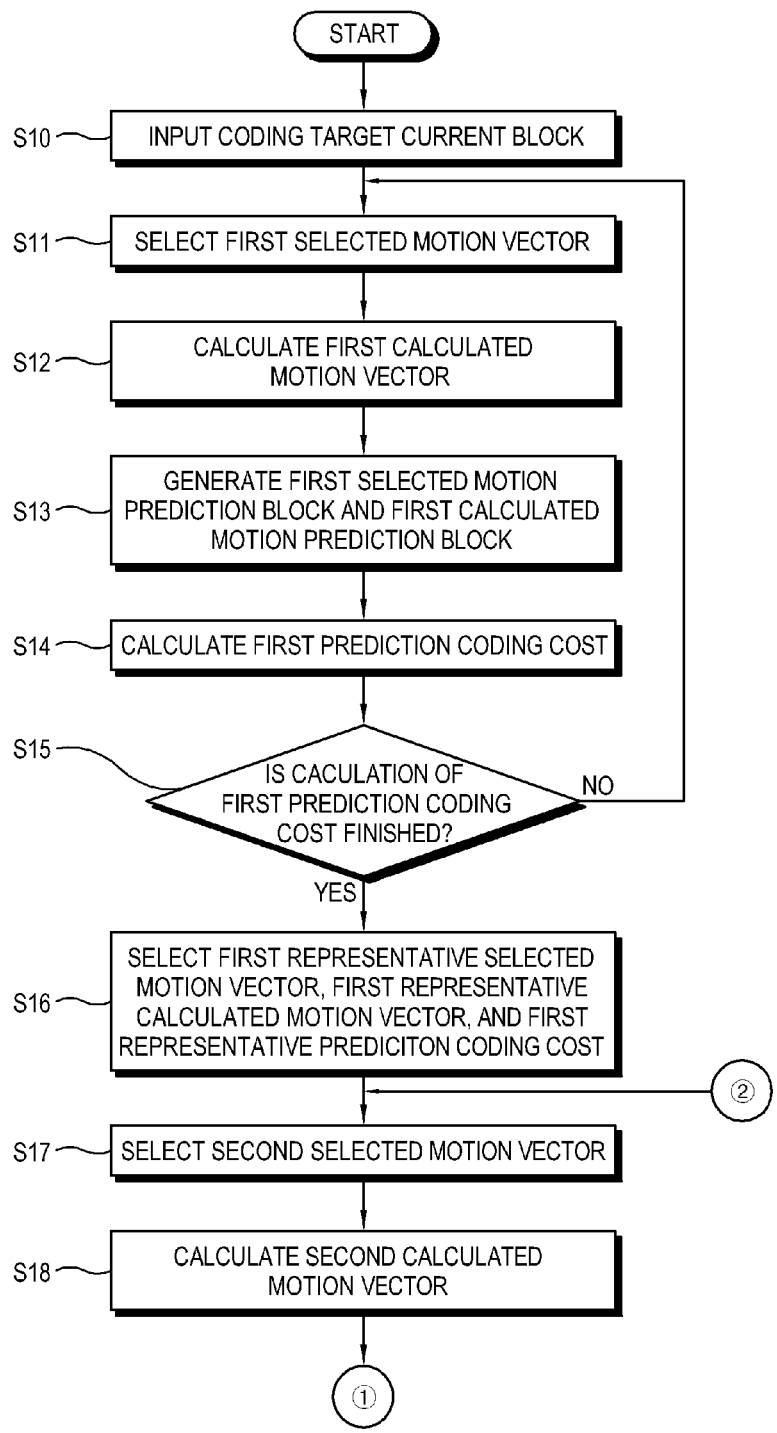
FIGS. 1 and 2 are drawings for describing a bi-prediction coding method in accordance with the present invention.

The present invention provides a bi-prediction coding method using a plurality of reference pictures, which includes the steps of: (a) selecting a first selected motion vector to a first reference picture for a current block to be coded; (b) calculating a first calculated motion vector to a second reference picture based on the first selected motion vector; (c) calculating first predicted coding cost based on the first selected motion vector, the first calculated motion vector, a first selected motion prediction block corresponding to the first selected motion vector, and a first calculated motion prediction block corresponding to the first calculated motion vector; (d) choosing a first representative selected motion vector and a first representative calculated motion vector that satisfy a predetermined criterion, and first representative predicted coding cost based on the first representative selected motion vector and the first representative calculated motion vector by repetitively performing the steps (a) to (c); (e) selecting a second selected motion vector from the second reference picture; (f) calculating a second calculated motion vector to the first reference picture based on the second selected motion vector; (g) calculating second predicted coding cost based on the second selected motion vector, the second calculated motion vector, a second selected motion prediction block corresponding to the second selected motion vector, and a second calculated motion prediction block corresponding to the second calculated motion vector; (h) choosing a second representative selected motion vector and a second representative calculated motion vector that satisfy a predetermined criterion, and second representative predicted coding cost based on the second representative selected motion vector and the second representative calculated motion vector by repetitively performing the steps (e) to (g); (i) choosing the first representative selected motion vector as a coding target motion vector and the first representative calculated motion vector as a non-coding target motion vector if the first representative predicted coding cost is smaller than the second representative predicted coding cost, and choosing the second representative selected motion vector as the coding target motion vector and the second representative calculated motion vector as the non-coding target motion vector if the second representative predicted coding cost is smaller than the first representative predicted coding cost; and (j) coding the coding target motion vector.

The present invention provides a bi-prediction decoding method for decoding bi-prediction coded data by using a plurality of reference pictures, which includes the steps of: (a) determining whether or not a current block to be decoded is a bi-prediction coding mode by analyzing the coded data; (b) recovering a decoding target motion vector by decoding the coded data in a case where it is determined that the current block is the bi-prediction coding mode; (c) calculating the recovered decoding target motion vector, and a non-decoding target motion vector corresponding to a second reference picture based on a temporal distance between a current picture to which the current block belongs and a first decoding reference picture corresponding to the decoding target motion vector and a temporal distance between the current picture and a second decoding reference picture; and (d) reconstructing the current block based on a generated prediction block by generating the prediction block for the current block based on the recovered decoding target motion vector and the calculated non-decoding target motion vector.

MODE FOR THE INVENTION

Hereinafter, embodiments of the present will be described in more detail with reference to the accompanying drawings.

Figure 2:
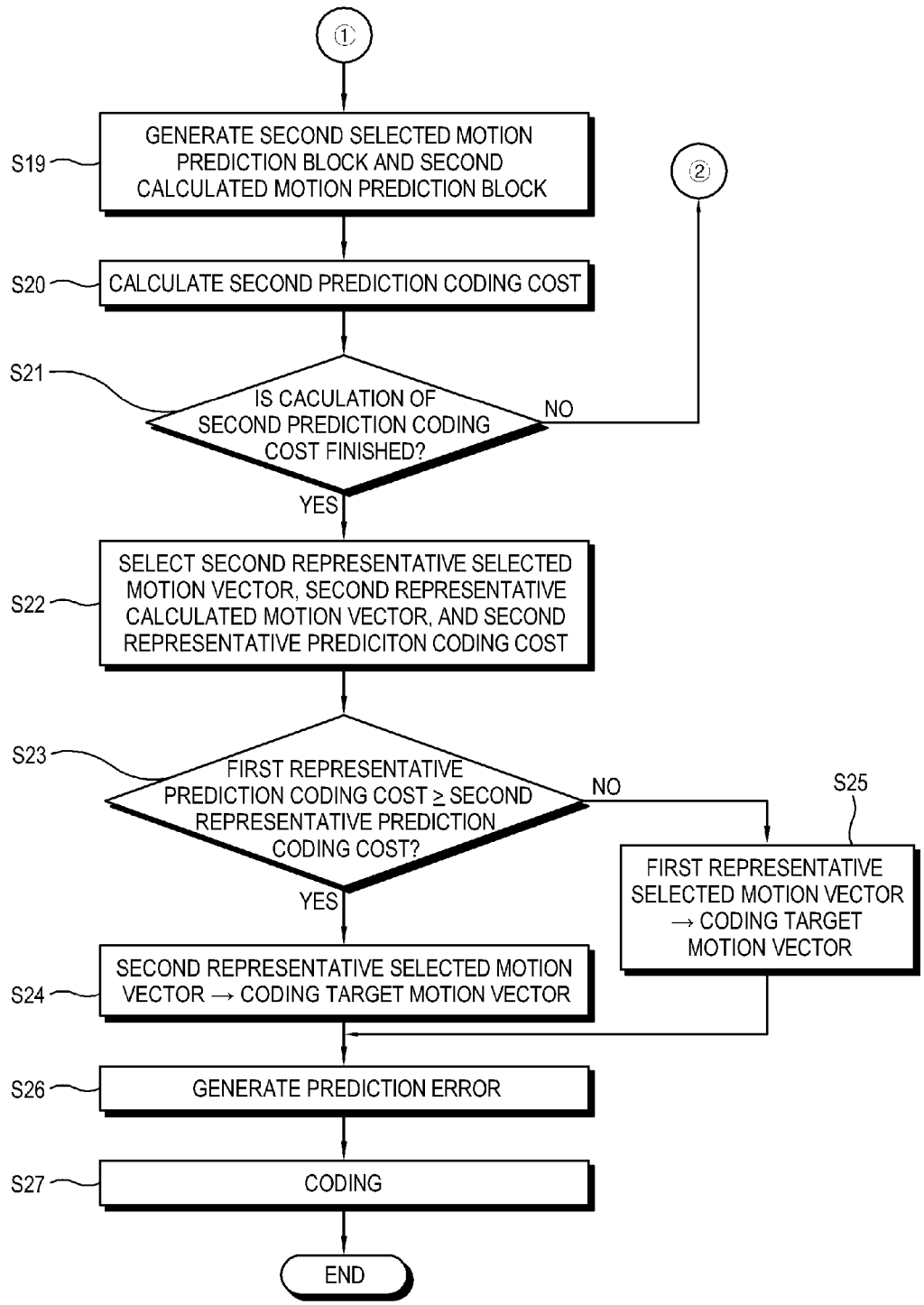

FIGS. 1 and 2 are flowcharts for a bi-prediction coding method in accordance with the present invention. Referring to FIGS. 1 and 2, first, when an N by M block (hereinafter, referred to as 'current block') which is a coding target is inputted (S10), a first reference picture and a second reference picture are determined based on a current picture to which the current block belongs. Herein, a block size of N by M may include a case that N and M are the same as each other or different from each other.

Then, a motion vector (hereinafter, referred to as 'first selected motion vector') is selected within a predetermined motion search range from a first reference picture (S11). A motion vector (hereinafter, referred to as 'first calculated motion vector') for a second reference picture corresponding to the first reference picture is calculated based on the first selected motion vector (S12). Herein, the first selected motion vector selected from the first reference picture is actually coded and transmitted in a case the first selected motion vector is chosen as a coding target motion vector in a process to be described below and the first calculated motion vector is a motion vector to be calculated in a decoding process based on the transmitted coding target motion vector and becomes a motion vector which is not coded, that is, a non-transmitted motion vector in a coding process.

Next, a first selected motion prediction block for the first selected motion vector is generated and a first calculated motion prediction block for the first calculated motion vector is generated (S13). Prediction coding cost (hereinafter, referred to as 'first prediction coding cost') is calculated based on the first selected motion vector, the first calculated motion vector, the first selected motion prediction block, and the first calculated motion prediction block (S14).

Then, a plurality of first prediction coding costs are calculated by repetitively performing the steps S11 to S14 for the selected first and second reference pictures. When the calculation of the plurality of first prediction coding costs for the first and second reference pictures is finished (S15), the first prediction coding cost which satisfies a predetermined criterion is chosen among the calculated plurality of first prediction coding costs. Herein, the choosing reference of the first prediction coding cost is established so that the lowest coding cost is chosen among the first prediction coding costs.

The selected first prediction coding cost, and the first selected motion vector and the first calculated motion vector which are used for calculating the selected first prediction coding cost are chosen as first representative prediction cost, and a first representative selected motion vector and a representative calculated motion vector, respectively (S16).

Meanwhile, in correspondence with the above-described process, a motion vector (hereinafter, referred to as 'second selected motion vector') is selected from the second reference picture (S17) and a motion vector (hereinafter, referred to as 'second calculated motion vector') for the first reference picture is calculated based on the selected second selected motion vector (S18).

Next, a second selected motion prediction block for the second selected motion vector is generated and a second calculated motion prediction block for the second calculated motion vector is generated (S19). Prediction coding cost (hereinafter, referred to as 'second prediction coding') is calculated based on the second selected motion vector, the second calculated motion vector, the second selected motion prediction block, and the second calculated motion prediction block (S20).

A plurality of second prediction coding costs are calculated by repetitively performing the steps S17 to S20 for the first and second reference pictures. After then, when the calculation of the second prediction coding costs is finished (S21), the second prediction coding cost that satisfies a predetermined criterion is chosen among the calculated plurality of second prediction coding costs. Herein, the choosing reference of the second prediction coding cost is established so that the lowest coding cost is chosen among the second prediction coding costs.

The chosen second prediction coding cost, and the second selected motion vector and the second calculated motion vector which are used for calculating the chosen second prediction coding cost are chose as second representative prediction coding cost, and a second representative selected motion vector and a second representative calculated motion vector (S22).

Through the above-described process, when the first representative prediction coding cost and the second representative prediction coding cost are chosen, the first representative prediction coding cost and the second representative prediction coding cost are compared with each other (S23). At this time, if the first representative prediction coding cost is smaller than the second representative prediction coding cost, the first representative selected motion vector is chosen as the coding target motion vector and the first representative calculated motion vector is chosen as a non-coding target motion vector (S25).

Meanwhile, if the second representative prediction coding cost is smaller than the first representative prediction coding cost, the second representative selected motion vector is chosen as the coding target motion vector and the second representative calculated motion vector is chosen as the non-coding target motion vector (S24).

Through the above-described process, when the choice of the coding target motion vector and the non-coding target motion vector is finished, a prediction block for the current block is generated by using the chosen coding target motion vector and non-coding target motion vector. A residual block which is a difference between the current block and the prediction block is generated (S26).

Next, the coding target motion vector and the residual block are coded (S27). At this time, in the coding process, the coding target motion vector and the residual block can be coded and transmitted with bi-prediction coding mode information having information indicating that an image is coded by the above-described coding method, that is, the bi-prediction coding method in accordance with the present invention. Accordingly, in the decoding process, a non-transmitted non-coding target motion vector is calculated by using the transmitted coding target motion vector.

In the above-described process, the first reference picture and the second reference picture can be determined to correspond to each other. In a case that the second selected motion vector is selected from the second reference picture to which the first calculated motion vector calculated by the first selected motion vector belongs, the first reference picture used in calculating the second calculated motion vector by using the second selected motion vector selected from the corresponding second reference picture may become the first reference picture to which the first selected motion vector belongs.

Hereinafter, a method of calculating the first calculated motion vector and the second calculated motion vector in the bi-prediction coding method in accordance with the present invention will be described in detail with reference to FIGS. 3 to 5.

The first calculated motion vector in accordance with the present invention is calculated by multiplying a relative temporal distance between the current picture, and the first reference picture and the second reference picture by the first selected motion vector. Similarly, the second calculated motion vector is calculated by multiplying a relative temporal distance between the current picture to which the current block belongs, and the first reference picture and the second reference picture by the second selected motion vector. Hereinafter, the first selected motion vector and the first calculated motion vector will be described.

FIGS. 3a and 3b show a case that the first reference picture and the second reference picture are earlier and later than the current picture, respectively. FIG. 3a shows the case that the first reference picture is earlier than the current picture and the second reference picture is later than the current picture. FIG. 3b shows the case vice versa.

Figure 3:
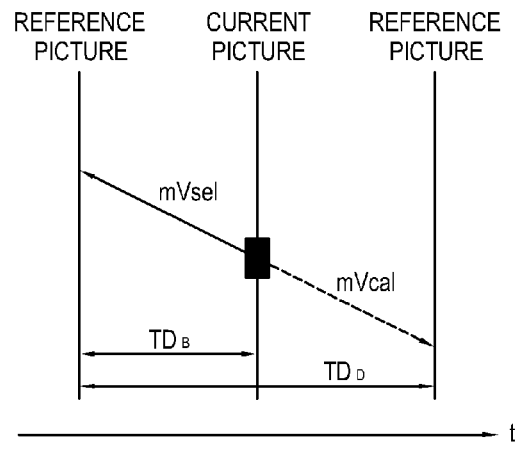
FIGS. 3 to 5 illustrate examples of temporal relations between a current picture and a first reference picture and a second reference picture in the bi-prediction coding method in accordance with present invention.
Figure 3:
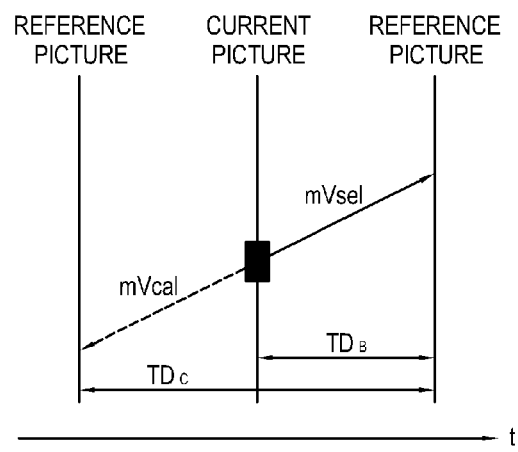

As shown in FIG. 3, in the case that the first reference picture and the second reference picture are earlier and later than the current picture, respectively, the first calculated motion vector is calculated by:

$$mv_{cal} = -\frac{TD_C}{TD_B} \times mv_{sel} \qquad \text{Equation 5}$$

Herein, $mv_{cal}$ is a first calculated motion vector, $mv_{sel}$ is the first selected motion vector, $TD_B$ is the temporal distance between the first reference picture and the current picture, and $TD_C$ is the temporal distance between the second reference picture and the current picture.

$TD_C$ may be given by:

$$TD_C = TD_D - TD_B \qquad \text{Equation 6}$$

Herein, $TD_D$ is a temporal distance between the first reference picture and the second reference picture as shown in FIG. 3, and $TD_B$ is the temporal distance between the current picture and the first reference picture.

Meanwhile, FIGS. 4a and 4b show a case that both the first reference picture and the second reference picture are earlier than the current picture. FIG. 4a shows a case that the first reference picture is later than the second reference picture and FIG. 4b shows a case that the second reference picture is later than the first reference picture.

Figure 4:
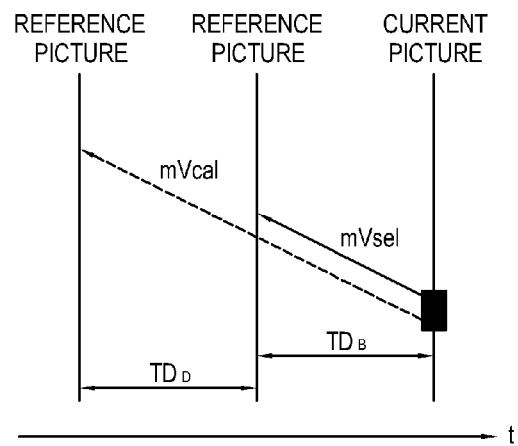
Figure 4:
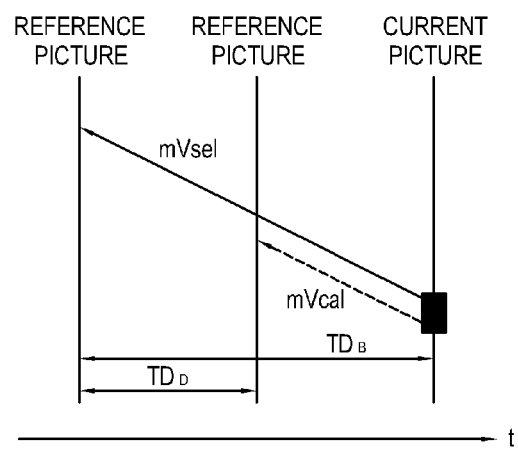

As shown in FIG. 4, in the case that both the first reference picture and the second reference picture are earlier than the current picture, the first calculated motion vector is calculated by:

$$mv_{cal} = \frac{TD_C}{TD_B} \times mv_{sel} \qquad \text{Equation 7}$$

Herein, $mv_{cal}$ is the first calculated motion vector, $mv_{sel}$ is the first selected motion vector, $TD_B$ is the temporal distance between the first reference picture and the current picture, and $TD_C$ is the temporal distance between the second reference picture and the current picture.

When $TD_C$ of Equation 7 is expressed by using $TD_D$ which is the temporal distance between the first reference picture and the second reference picture, and the $TD_B$ which is the temporal distance between the current picture and the first reference picture, $TD_C$ may be given by Equation 8 for FIG. 4a and by Equation 9 for FIG. 4b.

$$TD_C = TD_D + TD_B \qquad \text{Equation 8}$$

$$TD_C = TD_B - TD_D \qquad \text{Equation 9}$$

Meanwhile, FIGS. 5a and 5b show a case that both the first reference picture and the second reference picture are later than the current picture. FIG. 5a shows a case that the first reference picture is earlier than the second reference picture and FIG. 5b shows a case that the second reference picture is earlier than the first reference picture.

Figure 5:
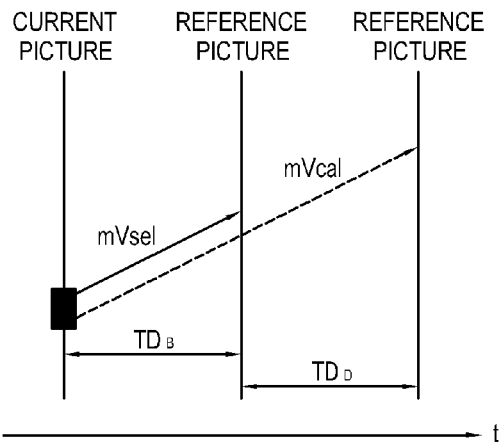
Figure 5:
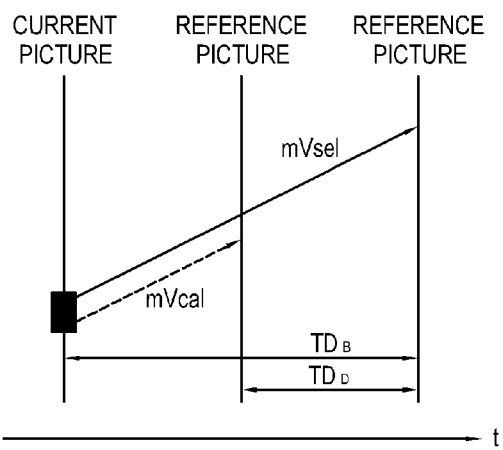

As shown in FIG. 5, in the case that the both the first reference picture and the second reference picture are later than the current picture, the first calculated motion vector is calculated by Equation 7.

When $TD_C$ of Equation 7 is expressed by using $TD_D$ which is the temporal distance between the first reference picture and the second reference picture, and the $TD_B$ which is the temporal distance between the current picture and the first reference picture, $TD_C$ may be given by Equation 8 for FIG. 5a and by Equation 9 for FIG. 5b.

Herein, when Equation 5 to Equation 9 are applied to a case of calculating the second calculated motion vector, the first reference picture and the second reference picture are exchanged with each other. That is, the first reference picture in Equation 5 to Equation 9 is a reference picture for selecting the motion vector and the second reference picture is a reference picture for calculating the motion vector. Accordingly, the motion vector is selected from the second reference picture and the motion vector is calculated from the first reference picture in the calculation of the second calculated motion vector. Therefore, the first reference picture and the second reference picture are exchanged with each other in Equation 5 to Equation 9 in the calculation of the second calculated motion vector.

Hereinafter, a bi-prediction coding apparatus in accordance with the present invention will be described in detail with reference to FIGS. 6 and 7.

Figure 6:
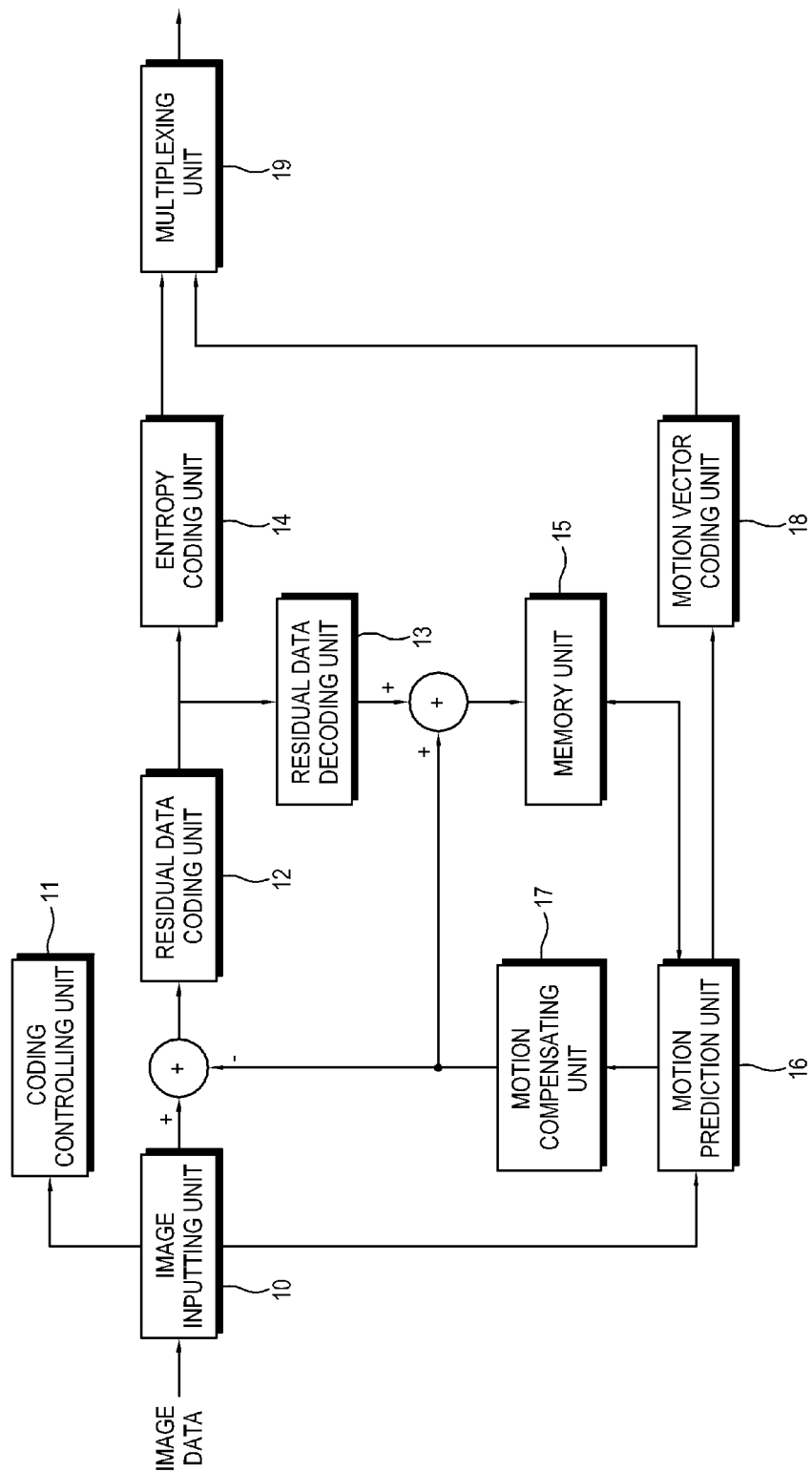
FIG. 6 illustrates a configuration of a bi-prediction coding apparatus in accordance with the present invention.

Referring to FIG. 6, the bi-prediction coding apparatus in accordance with the present invention may include an image inputting unit 10, a motion predicting unit 16, a motion compensating unit 17, a motion vector coding unit 18, a residual data coding unit 12, a residual data decoding unit 13, an entropy coding unit 14, a multiplexing unit 19, and a coding controlling unit 11.

An uncompressed digital moving image as a coding target image is inputted into the image inputting unit 10. Herein, moving image data inputted into the image inputting unit 10 is composed of blocks divided in predetermined sizes. The moving image data inputted through the image inputting unit 10 is subtracted through a prediction block outputted from the motion compensating unit 17, that is, a compensation value and a subtraction unit, and is outputted to the residual data coding unit 12.

When the moving image data is inputted through the image inputting unit 10, The coding controlling unit 11 performs a corresponding controlling operation by determining a coding type depending on whether or not motion compensation is performed for the inputted moving image data, for example, intracoding and intercoding.

The residual data coding unit 12 quantizes the image data outputted from the subtraction unit, that is, transformation coefficients acquired by transforming and coding a residual block according to a predetermined quantization process and generates N by M data which is two-dimension data constituted of the quantized transformation coefficients. Herein, a DCT (Discrete Cosine Transform) method may be adopted as an example of a transformation method applied in the residual data coding unit 12.

Since the moving image data coded by being inputted into the residual data coding unit 12 may be used as a reference picture for motion compensation of image data input thereafter or therebefore, the coded image data is subjected to dequantization and inverse transformation coding which are inverse processes to the processes performed in the residual data coding unit 12 through the residual data decoding unit 13. Image data outputted from the residual data decoding unit 13 is stored in a memory unit 15. In a case that the image data outputted from the residual data decoding unit 13 is differential image data, data outputted from the motion compensating unit 17, that is, the prediction block is added to the image data and then, is stored in the memory unit 15.

Meanwhile, the motion predicting unit 16 predicts a motion by using a plurality of reference pictures, that is, the above-described first and second reference pictures. The motion predicting unit 16 selects a coding target motion vector and a non-coding target motion vector and the motion compensating unit 17 calculates the prediction block for the current block, that is, a compensation value for the current block by using the coding target motion vector and the non-coding target motion vector.

Figure 7:
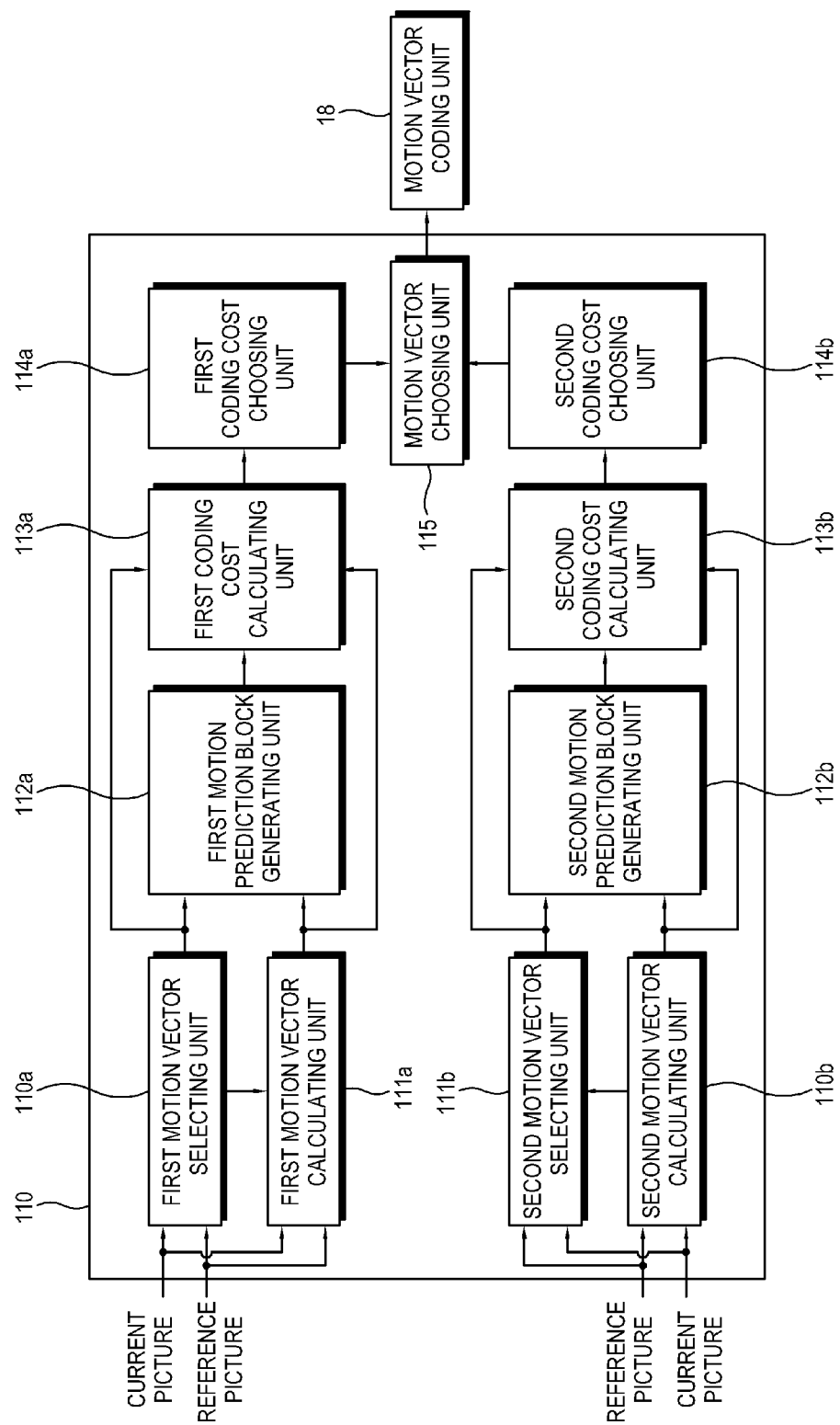
FIG. 7 illustrates an example of a configuration of a motion predicting unit of the bi-prediction coding apparatus of FIG. 6.

FIG. 7 shows a configuration of the motion predicting unit 16 in accordance with the present invention. Referring to FIG. 7, a first motion vector selecting unit 110a selects first selected motion vectors corresponding to the first reference pictures within a predetermined motion search range from the first reference pictures based on the current block to be coded.

A first motion vector calculating unit 111a calculates first calculated motion vectors corresponding to the second reference pictures by using the first selected motion vectors selected in the first motion vector selecting unit 110a. Herein, a process of calculating the first calculated motion vectors may be expressed by Equation 5 to Equation 9, and detailed description thereof is omitted.

A second motion vector selecting unit 110b selects second selected motion vectors corresponding to the second reference pictures from the second reference pictures extracted by a reference picture extracting unit. A second motion vector calculating unit 111b calculates second calculated motion vectors corresponding to the first reference pictures by using the second selected motion vectors selected in the second motion vector selecting unit 110b. Herein, a process of calculating the second calculated motion vectors may be expressed by Equation 5 to Equation 9, and detailed description thereof is omitted.

A first motion prediction block generating unit 112a generates first selected motion prediction blocks corresponding to the first selected motion vectors and first calculated motion prediction blocks corresponding to the first calculated motion vectors based on the first selected motion vectors and the first calculated motion vectors.

A first coding cost calculating unit 113a calculates first prediction coding costs by using the first selected motion vectors, the first calculated motion vectors, the first selected motion prediction blocks, and the first calculated motion prediction blocks. Herein, the first prediction coding costs are calculated for the first selected coding costs selected from the plurality of first reference pictures.

Herein, a first coding cost choosing unit 114a chooses any one that satisfies a predetermined criterion among the first prediction coding costs calculated by the first coding cost calculating unit 113a. In the present invention, the lowest first prediction coding cost is chosen.

The first coding cost choosing unit 114a chooses the chosen first prediction coding cost, and the first selected motion vector and the first calculated motion vector for the chosen first prediction coding cost as first representative prediction coding cost, and a first representative selected motion vector and a first representative calculated motion vector, respectively.

Similarly, a second motion prediction block generating unit 112b generates the second selected motion prediction block corresponding to the second selected motion vector and the second calculated motion prediction block corresponding to the second calculated motion vector.

A second coding cost calculating unit 113b calculates a plurality of second prediction coding costs by using the second selected motion vector, the second calculated motion vector, the second selected motion prediction block, and the second calculated motion prediction block.

Herein, a second coding cost choosing unit 114b chooses any one that satisfies a predetermined criterion among the second prediction coding costs calculated by the second coding cost calculating unit 113b. In the present invention, the lowest second prediction coding cost is chosen.

The second coding cost choosing unit 114b chooses the chosen second prediction coding cost, and the second selected motion vector and the second calculated motion vector for the chosen second prediction coding cost as second representative prediction coding cost, and a second representative selected motion vector and a second representative calculated motion vector, respectively.

The first representative prediction coding cost and the second representative prediction coding cost respectively chosen by the first representative coding cost choosing unit and the second representative coding cost choosing unit are compared with each other by a motion vector choosing unit 115. The motion vector choosing unit 115 chooses the first representative selected motion vector as the coding target motion vector and the first representative calculated motion vector as the non-coding target motion vector if the first representative prediction coding cost is smaller than the second representative prediction coding cost.

Meanwhile, the motion vector choosing unit 115 chooses the second representative selected motion vector as the coding target motion vector and the second representative calculated motion vector as the non-coding target motion vector if the second representative prediction coding cost is smaller than the first representative prediction coding cost.

The motion compensating unit 17 outputs the prediction block to the subtraction unit by performing the motion compensation by using the coding target motion vector and the non-coding target motion vector chosen through the above-described process. Herein, the motion compensating unit 17 determines and output the prediction block for the current block based on the coding target motion vector and the non-coding target motion vector.

Meanwhile, the motion vector coding unit 18 codes and outputs the coding target motion vector chosen by the motion predicting unit 16. Herein, the motion vector coding unit 18 can code bi-prediction coding mode information for reporting that the coded motion vector is coded by the bi-prediction coding method with the coding target motion vector.

The data coded by the motion vector coding unit 18 is inputted into the multiplexing unit 19 with image data coded by the entropy coding unit 14. The inputted data are generated in a compressed bitstream pattern and is transmitted.

Figure 8:
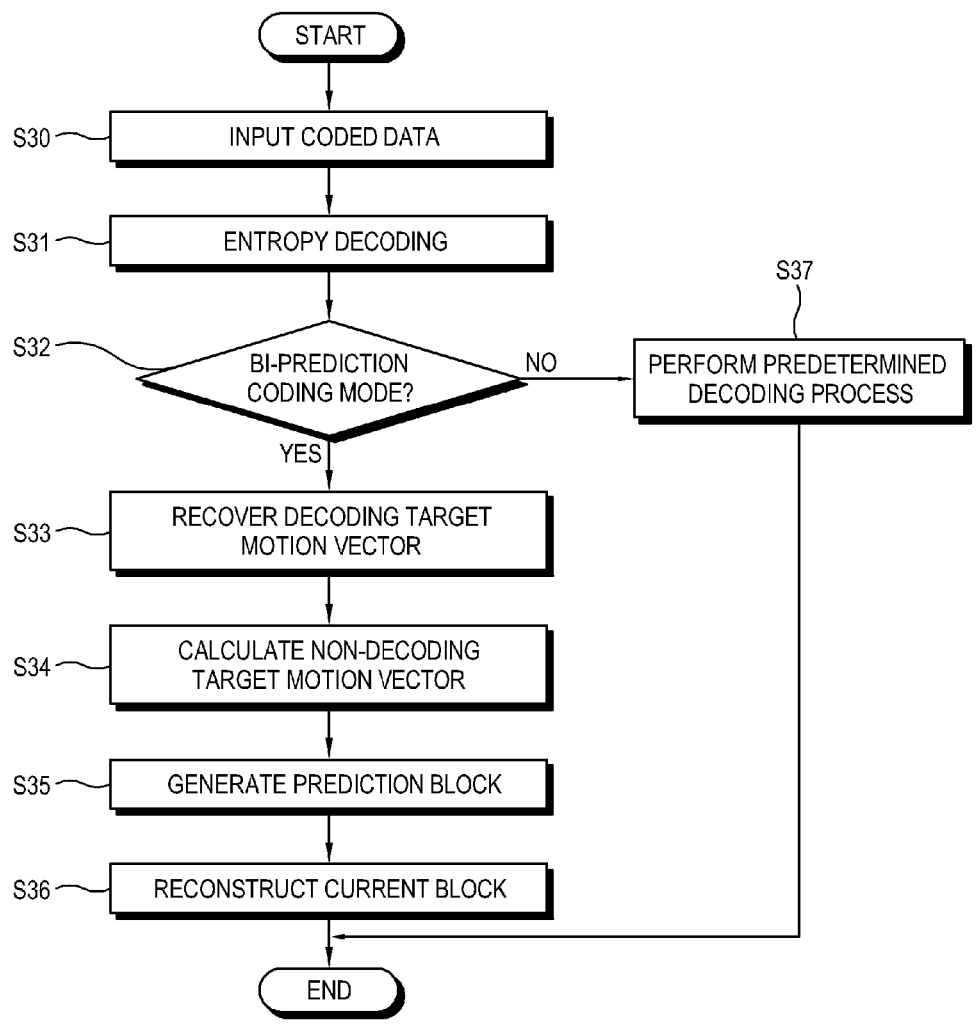
FIG. 8 is a drawing for describing a bi-prediction decoding method in accordance with the present invention.

Hereinafter, a bi-prediction decoding method in accordance with the present invention will be described in detail with reference to FIG. 8.

First, when the compressed bitstream which is coded data is inputted (S30), entropy decoding for the inputted bitstream is performed (S31). After then, whether or not a current block to be decoded is in the bi-prediction coding mode is determined by analyzing the entropy-decoded data (S32). Herein, whether or not the current block is in the bi-prediction coding mode can be determined by checking the existence or nonexistence of the bi-prediction coding mode information coded in the coding process through the above-described bi-prediction coding method.

Herein, if it is determined that the current block is in the bi-prediction coding mode, a decoding target motion vector is recovered among the entropy-decoded data (S33). Herein, the decoding target motion vector is the coding target motion vector coded through the above-described bi-prediction coding method.

After then, a non-decoding target motion vector for a second decoding reference picture is calculated by using a temporal distance between a current picture to which the current block to be decoded and a reference picture (hereinafter, referred to as 'first decoding reference picture') corresponding to the decoding target motion vector, a temporal distance between the current picture and the other reference picture (hereinafter, referred to as 'second decoding reference picture'), and the recovered decoding target motion vector (S34).

Herein, the non-decoding target motion vector is calculated by the method of calculating the first calculated motion vector (or the second calculated motion vector) by using the first selected motion vector (or the second selected motion vector) in the above-described bi-prediction coding method, that is, by Equation 5 to Equation 9.

Herein, the decoding motion vector, the first decoding reference picture, and the second decoding reference picture in the bi-prediction decoding method are applied to Equation 5 to Equation 9 by corresponding to the first selected motion vector, the first reference picture corresponding to the first selected motion vector, and the second reference picture corresponding to the calculated first calculated motion vector. Therefore, the decoding motion vector is calculated.

As described above, when the non-decoding motion vector is calculated, the prediction block is generated by the decoding motion vector and the non-decoding motion vector (S35). Herein, a pair of prediction block may be generated by corresponding to the first decoding reference picture and the second decoding reference picture.

When the prediction block is generated, the decoded data is subjected to the entropy decoding process and a residual data decoding process, thereby generating a residual block for the current block. A recovery image is generated by adding the residual block and the prediction block to each other (S36).

Meanwhile, if the data inputted in the step S32 is not in the bi-prediction coding mode, the decoding is performed through a predetermined decoding process, for example, a previously known decoding method (S37).

Figure 9:
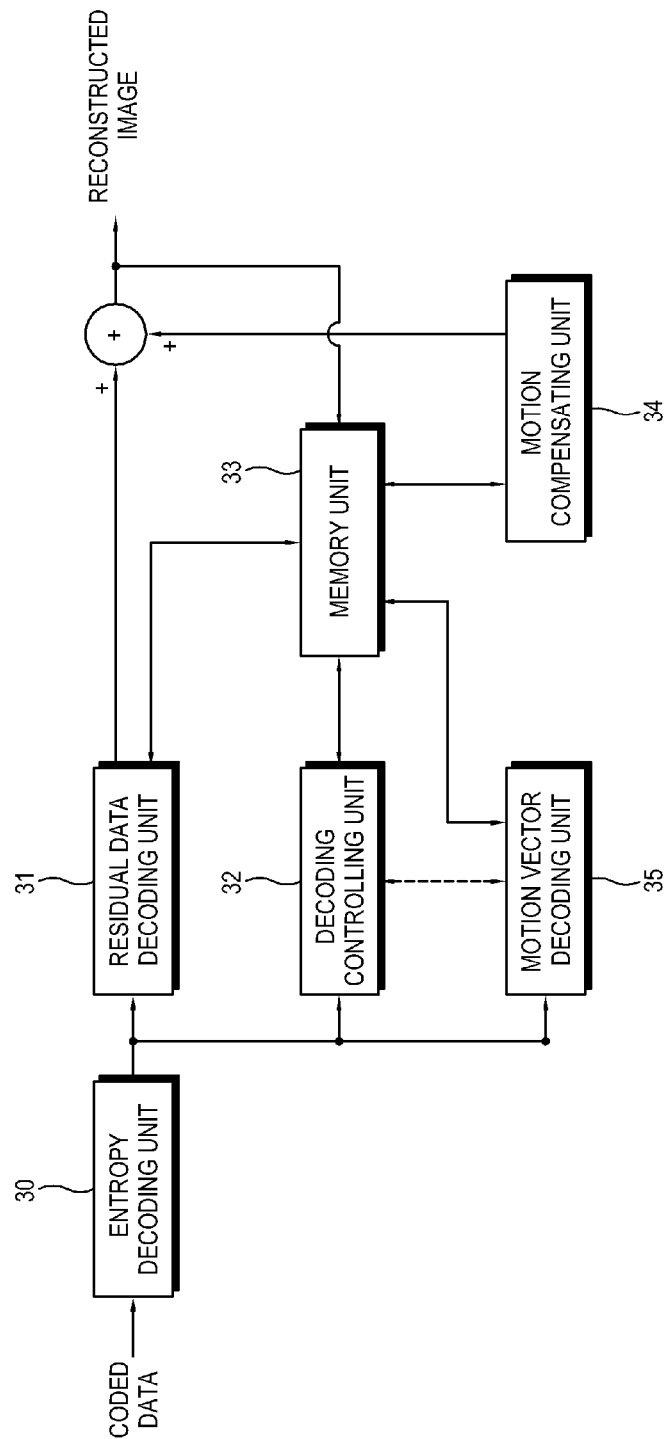
FIG. 9 illustrates a configuration of a bi-prediction decoding apparatus in accordance with the present invention.

Hereinafter, a bi-prediction decoding apparatus in accordance with the present invention will be described in detail with reference to FIG. 9. As shown in FIG. 9, the bi-prediction decoding apparatus may include an entropy decoding unit 30, a residual data decoding unit 31, a motion vector decoding unit 35, a motion compensating unit 34, a memory unit 33, and a decoding controlling unit 32.

The entropy decoding unit 30 outputs decoded and inputted data by entropy-decoding the data. Herein, entropy-coded quantized transformation coefficients, the decoding target motion vector, information on the motion vectors, and the like are entropy-decoded and outputted in the entropy decoding unit 30.

The residual data decoding unit 31 decodes image data by dequantizing and inversely transforming the entropy-decoded transformation coefficients.

The decoding controlling unit 32 extracts a coding type of coded and inputted data from the data decoded by the entropy decoding unit 30. Herein, in a case that the coded and inputted data is the data coded by the above-described bi-prediction coding method, the bi-prediction coding mode information coded together in the bi-prediction coding process and the decoding controlling unit 32 recognizes that the corresponding data is coded through the bi-prediction coding method based on the reception of the bi-prediction coding mode information.

Figure 10:
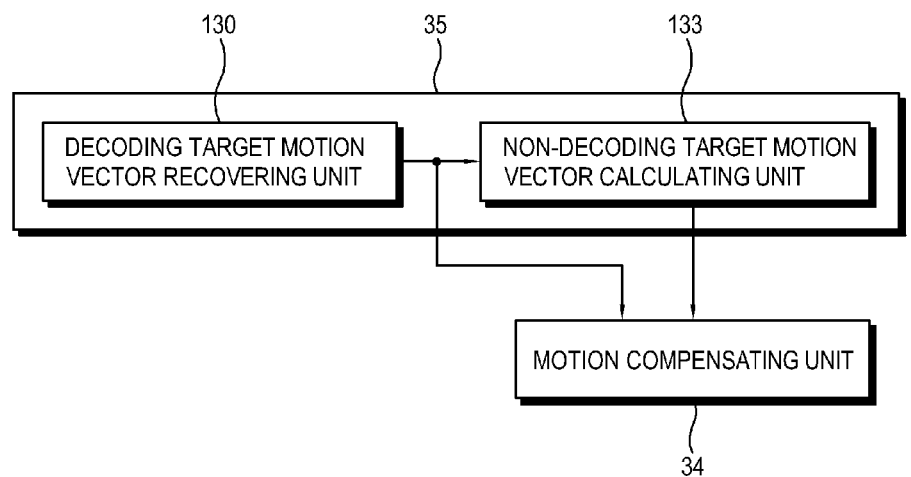
FIG. 10 illustrates an example of a configuration of a motion vector decoding unit of the bi-prediction decoding apparatus of FIG. 9.

If the decoding controlling unit 32 determines that the corresponding data is in the bi-prediction coding mode, the motion vector decoding unit 35 recovers the decoding target motion vector among the data decoded by the entropy decoding unit 30. Referring to FIG. 10, the motion vector decoding unit 35 may include a decoding target motion vector recovering unit 130 and a non-decoding target motion vector calculating unit 133.

If the decoding controlling unit 32 determines that the corresponding data is in the bi-prediction coding mode, the decoding target motion vector recovering unit 130 recognizes the motion vector decoded by the entropy decoding unit 30 as the decoding target motion vector.

The non-decoding target motion vector calculating unit 133 calculates the non-decoding target motion vector by using the decoding target motion vector, and the temporal distances between the current picture, and the first and second decoding reference pictures stored in the memory unit 33. Herein, the calculation of the non-decoding target motion vector is described in the above-described bi-prediction decoding method and thus detailed description thereof is omitted.

Meanwhile, the motion compensating unit 34 generates the prediction block by using the decoding target motion vector and the non-decoding target motion vector which are outputted from the motion vector decoding unit 35. Herein, as described above, the pair of prediction blocks may be generated by corresponding to the first decoding reference picture and the second decoding reference picture.

The prediction block generated by the motion compensating unit 34 is added to the residual block outputted through the entropy decoding process and the residual data decoding process by an adder, thereby generating a recovery image of the current block (S36). The generated recovery image of the current block is stored in the memory unit 33 for the motion compensation.

As described above, although preferred embodiments of the present invention have been described in detail, it will be understood by those skilled in the art that various changes and modifications may be made without departing from the principles and spirit of the general inventive concept, the scope of which is defined in the appended claims and their equivalents.

INDUSTRIAL APPLICABILITY

The present invention can be used for coding and decoding capable of solving a problem of complexity in implementing bi-prediction of moving image compression and improving coding efficiency by more efficiently transmitting motion vectors by using a fact that an moving image is linearly moved.

The invention claimed is:

1. A bi-prediction coding method using a plurality of reference pictures, comprising the steps of:
   (a) selecting a first selected motion vector from a first reference picture for a current block to be coded;
   (b) calculating a first calculated motion vector for a second reference picture based on the first selected motion vector;
   (c) calculating first predicted coding cost based on the first selected motion vector, the first calculated motion vector, a first selected motion prediction block corresponding to the first selected motion vector, and a first calculated motion prediction block corresponding to the first calculated motion vector;
   (d) choosing a first representative selected motion vector and a first representative calculated motion vector that satisfy a first predetermined reference, and first representative predicted coding cost based on the first representative selected motion vector and the first representative calculated motion vector by repetitively performing the steps (a) to (c);
   (e) selecting a second selected motion vector from the second reference picture;
   (f) calculating a second calculated motion vector for the first reference picture based on the second selected motion vector;
   (g) calculating second predicted coding cost based on the second selected motion vector, the second calculated motion vector, a second selected motion prediction block corresponding to the second selected motion vector, and a second calculated motion prediction block corresponding to the second calculated motion vector;
   (h) choosing a second representative selected motion vector and a second representative calculated motion vector that satisfy a second predetermined reference, and second representative predicted coding cost based on the second representative selected motion vector and the second representative calculated motion vector by repetitively performing the steps (e) to (g);
   (i) choosing the first representative selected motion vector as a coding target motion vector and the first representative calculated motion vector as a non-coding target motion vector if the first representative predicted coding cost is smaller than the second representative predicted coding cost, and choosing the second representative selected motion vector as the coding target motion vector and the second representative calculated motion vector as the non-coding target motion vector if the second representative predicted coding cost is smaller than the first representative predicted coding cost; and
   (j) coding the coding target motion vector,
   wherein the coding target motion vector, which is meant to be coded, and non-coding target motion vector, which is not meant to be coded, are calculated with respect to the identical current block.

2. The bi-prediction coding method according to claim 1, wherein the step (j) includes a step of coding bi-prediction coding mode information for reporting that the coding is a bi-prediction coding mode coded by the bi-prediction coding method.

3. The bi-prediction coding method according to claim 2, wherein in the step (b), the first calculated motion vector is calculated by multiplying relative temporal distances between a current picture to which the current block belongs, and the first reference picture and the second reference picture by the first selected motion vector, and wherein in the step (f), the second calculated motion vector is calculated by the relative temporal distances between the current picture, and the first reference picture and the second reference picture by the second selected motion vector.

4. The bi-prediction coding method according to claim 3, wherein in a case where the first reference picture and the second reference picture are earlier and later than the current picture, respectively, the first calculated motion vector and the second calculated motion vector in the step (b) and the step (f) are calculated by:

$$mv_{cal} = -\frac{TD_C}{TD_B} \times mv_{sel},$$

wherein, $mv_{cal}$ is the first calculated motion vector or the second calculated motion vector, $mv_{sel}$ is the first selected motion vector or the second selected motion vector, $TD_B$ is a temporal distance between any one of the first reference picture and the second reference picture in which the first selected motion vector or the second selected motion vector is selected, and the current picture, and $TD_C$ is a temporal distance between any one of the first reference picture and the second reference picture in which the first calculated motion vector or the second calculated motion vector is calculated.

5. The bi-prediction coding method according to claim 3, wherein in the case where both the first reference picture and the second reference picture are earlier or later than the current picture, the first calculated motion vector and the second calculated motion vector in the step (b) and the step (f) are calculated by:

$$mv_{cal} = \frac{TD_C}{TD_B} \times mv_{sel}$$

wherein $mv_{cal}$ is the first calculated motion vector or the second calculated motion vector, $mv_{sel}$ is the first selected motion vector or the second selected motion vector, $TD_B$ is a temporal distance between any one of the first reference picture and the second reference picture in which the first selected motion vector or the second selected motion vector is selected, and the current picture, and $TD_C$ is a temporal distance between any one of the first reference picture and the second reference picture in which the first calculated motion vector or the second calculated motion vector is calculated.

6. A bi-prediction decoding method for decoding bi-prediction coded data by using a plurality of reference pictures, the method comprising the steps of:
(a) determining whether or not a current block to be decoded is a bi-prediction coding mode by analyzing the coded data;
(b) recovering a decoding target motion vector by decoding the coded data in a case where it is determined that the current block is the bi-prediction coding mode;
(c) calculating a non-decoding target motion vector corresponding to a second reference picture based on the recovered decoding target motion vector, a temporal distance between a current picture to which the current block belongs and a first decoding reference picture corresponding to the decoding target motion vector and a temporal distance between the current picture and a second decoding reference picture; and
(d) recovering the current block based on a generated prediction block by generating the prediction block for the current block based on the recovered decoding target motion vector and the calculated non-decoding target motion vector,
wherein the decoding target motion vector, which is recovered by decoding the coded data, and the non-decoding target motion vector, which is calculated based on the decoding target motion vector, are related to the identical current block.

7. The bi-prediction decoding method according to claim 6, wherein in the step (c), the non-coding target motion vector is calculated by multiplying relative temporal distances between the current picture, and the first reference picture and the second reference picture by the decoding target motion vector.

8. The bi-prediction decoding method according to claim 7, wherein in a case where the first reference picture and the second reference picture are earlier and later than the current picture, respectively, the non-decoding target motion vector in the step (c) is calculated by:

$$mv_{cal} = -\frac{TD_C}{TD_B} \times mv_{sel}$$

wherein $mv_{cal}$ is the non-decoding target motion vector, $mv_{sel}$ is the decoding target motion vector, $TD_B$ is a temporal distance between the first reference picture and the current picture, and $TD_C$ is a temporal distance between the second reference picture and the current picture.

9. The bi-prediction decoding method according to claim 7, wherein in the case where both the first reference picture and the second reference picture are earlier or later than the current picture, the non-decoding target motion vector in the step (c) is calculated by:

$$mv_{cal} = \frac{TD_C}{TD_B} \times mv_{sel}$$

wherein $mv_{cal}$ is the non-decoding target motion vector, $mv_{sel}$ is the decoding target motion vector, $TD_B$ is a temporal distance between the first reference picture and the current picture, and $TD_C$ is a temporal distance between the second reference picture and the current picture.

10. A bi-prediction coding apparatus using a plurality of reference pictures, the apparatus includes:
a first motion vector selecting unit selecting first selected motion vectors corresponding to a plurality of first reference pictures within a predetermined motion search range based on a current block to be coded from the plurality of first reference pictures;
a first motion vector calculating unit calculating first calculated motion vectors corresponding to the first selected motion vectors based on the first selected motion vectors and second reference pictures corresponding to the first selected motion vectors;
a first coding cost calculating unit calculating first prediction coding costs corresponding to the first selected motion vectors based on the first selected motion vectors, the first calculated motion vectors, first selected motion prediction blocks corresponding to the first selected motion vectors, and first calculated motion prediction blocks corresponding to the first calculated motion vectors;
a first coding cost choosing unit choosing first representative prediction coding cost that satisfies a predetermined condition by comparing the calculated plurality of first prediction coding costs corresponding to the first selected motion vectors with each other;
a second motion vector selecting unit selecting second selected motion vectors corresponding to second reference pictures from the second reference pictures;
a second motion vector calculating unit calculating the second selected motion vectors and second calculated motion vectors corresponding to the second selected motion vectors based on the first reference pictures corresponding to the second selected motion vectors;
a second coding cost calculating unit calculating second prediction coding costs corresponding to the second selected motion vectors based on the second selected motion vectors, the second calculated motion vectors, second selected motion prediction blocks corresponding to the second selected motion vectors, and second calculated motion prediction blocks corresponding to the second calculated motion vectors;
a second coding cost choosing unit choosing second representative prediction coding cost that satisfies a predetermined condition by comparing the calculated plurality of second prediction coding costs corresponding to the second selected motion vectors with each other;
a motion vector choosing unit choosing any one of the first selected motion vectors corresponding to the first representative prediction coding cost as a coding target motion vector if the first representative prediction coding cost is smaller than the second representative prediction cost and any one of the second selected motion vectors corresponding to the second representative prediction coding cost as the coding target motion vector if the second representative prediction coding cost is smaller than the first representative prediction coding cost; and a motion vector coding unit coding the coding target motion vector, wherein the coding target motion vector, which is meant to be coded, and non-coding target motion vector, which is not meant to be coded, are calculated with respect to the identical current block.

11. The bi-prediction coding apparatus according to claim 10, wherein the motion vector coding unit codes bi-prediction coding mode information for reporting that the coding of the coding target motion vector is a bi-prediction coding mode by a bi-prediction coding method.

12. The bi-prediction coding apparatus according to claim 11, wherein the first motion vector calculating unit calculates the first calculated motion vector by multiplying a relative temporal distance between a current picture to which the current block belongs, and the first reference picture and the second reference picture by the first selected motion vector, and wherein the second motion vector calculating unit calculating the second calculated motion vector by multiplying the relative temporal distance between the current picture to which the current block belongs, and the first reference picture and the second reference picture by the second selected motion vector.

13. The bi-prediction coding apparatus according to claim 12, wherein in a case where the first reference picture and the second reference picture are earlier and later than the current picture, respectively, the first motion vector calculating unit and the second motion vector calculating unit calculate the first calculated motion vector and the second calculated motion vector, respectively, by:

$$mv_{cal} = -\frac{TD_C}{TD_B} \times mv_{sel}$$

wherein $mv_{cal}$ is the first calculated motion vector or the second calculated motion vector, $mv_{sel}$ is the first selected motion vector or the second selected motion vector, $TD_B$ is a temporal distance between any one of the first reference picture and the second reference picture in which the first selected motion vector or the second selected motion vector is selected, and the current picture, and $TD_C$ is a temporal distance between any one of the first reference picture and the second reference picture in which the first calculated motion vector or the second calculated motion vector is calculated.

14. The bi-prediction coding apparatus according to claim 12, wherein in the case where both the first reference picture and the second reference picture are earlier or later than the current picture, the first motion vector calculating unit and the second motion vector calculating unit calculate the first calculated motion vector and the second calculated motion vector, respectively, by:

$$mv_{cal} = \frac{TD_C}{TD_B} \times mv_{sel}$$

wherein $mv_{cal}$ is the first calculated motion vector or the second calculated motion vector, $mv_{sel}$ is the first selected motion vector or the second selected motion vector, $TD_B$ is a temporal distance between any one of the first reference picture and the second reference picture in which the first selected motion vector or the second selected motion vector is selected, and the current picture, and $TD_C$ is a temporal distance between any one of the first reference picture and the second reference picture in which the first calculated motion vector or the second calculated motion vector is calculated.

15. A bi-prediction decoding apparatus for decoding bi-prediction coded data by using a plurality of reference pictures, the apparatus includes:

an entropy decoding unit decoding the coded data;

a decoding controlling unit determining whether or not a current block to be decoded is coded through a bi-prediction coding mode by analyzing the decoded data;

a decoding target motion vector recovering unit recovering a decoding target motion vector from the decoded data if the current block is determined by the decoding controlling unit to be coded in the bi-prediction coding mode;

a non-decoding target motion vector unit calculating a non-decoding target motion vector corresponding to a second reference picture based on the recovered decoding target motion vector, a temporal distance between a current picture to which the current block belongs to and a first reference picture corresponding to the decoding target motion vector and a temporal distance between the current picture and the second reference picture;

a motion compensating unit generating at least one prediction block based on the recovered decoding target motion vector and the calculated non-decoding target motion vector; and a current block recovering unit recovering the current block based on the recovered data and the prediction block, wherein the decoding target motion vector, which is recovered by decoding the coded data, and the non-decoding target motion vector, which is calculated based on the decoding target motion vector, are related to the identical current block.

16. The bi-prediction decoding apparatus according to claim 15, wherein the non-decoding target motion vector calculating unit calculates the non-decoding target motion vector by multiplying relative temporal distances between the current picture and the first and second reference pictures by the decoding target motion vector.

17. The bi-prediction decoding apparatus according to claim 16, wherein in a case where the first reference picture and the second reference picture are earlier and later than the current picture, respectively, the non-decoding target motion vector calculating calculates the non-decoding target motion vector by:

$$mv_{cal} = -\frac{TD_C}{TD_B} \times mv_{sel}$$

wherein $mv_{cal}$ is the non-decoding target motion vector, $mv_{sel}$ is the decoding target motion vector, $TD_B$ is a temporal distance between the first reference picture and the current picture, and $TD_C$ is a temporal distance between the second reference picture and the current picture.

18. The bi-prediction decoding apparatus according to claim 16, wherein in the case where both the first reference picture and the second reference picture are earlier or later than the current picture, the non-decoding target motion vector calculating unit calculates the non-decoding target motion vector by:

$$mv_{cal} = \frac{TD_C}{TD_B} \times mv_{sel}$$

wherein $mv_{cal}$ is the non-decoding target motion vector, $mv_{sel}$ is the decoding target motion vector, $TD_B$ is a temporal distance between the first reference picture and the current picture, and $TD_C$ is a temporal distance between the second reference picture and the current picture.

19. The bi-prediction decoding method according to claim 6, wherein, in the step (a), determining whether or not a current block to be decoded is a bi-prediction coding mode by analyzing the coded data comprises:
checking whether the bi-prediction coding mode information exists in the coded data or not.

20. The bi-prediction decoding apparatus according to claim 15, wherein, the decoding controlling unit recognizes that the coded data is coded through the bi-prediction coding method, based on existence of bi-prediction coding mode information in the coded data.

* * * * *